United States Patent
Silverstone

(10) Patent No.: US 12,299,141 B2
(45) Date of Patent: *May 13, 2025

(54) ENABLING RELIABLE COMMUNICATIONS BETWEEN COMPUTING INSTANCES

(71) Applicant: CLOUD BROKER IP INNOVATION, LLC, Cumming, GA (US)

(72) Inventor: Ariel Silverstone, Bellevue, WA (US)

(73) Assignee: Cloud Broker IP Innovation, LLC, Cumming, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,788

(22) Filed: Sep. 27, 2023

(65) Prior Publication Data

US 2024/0020392 A1 Jan. 18, 2024

Related U.S. Application Data

(63) Continuation of application No. 14/308,600, filed on Jun. 18, 2014, now Pat. No. 11,797,689.

(Continued)

(51) Int. Cl.
*G06F 21/60* (2013.01)
*G06F 9/44* (2018.01)
(Continued)

(52) U.S. Cl.
CPC ............... *G06F 21/60* (2013.01); *G06F 9/44* (2013.01); *G06F 9/46* (2013.01); *G06F 9/50* (2013.01);
(Continued)

(58) Field of Classification Search
CPC ... G06F 21/60; G06F 9/44; G06F 9/46; G06F 9/50; G06F 21/62; G06F 9/45558; G06F 9/5072; G06F 9/5077; G06F 2009/4557; G06F 2009/45595; H04L 63/08; H04L 67/10
See application file for complete search history.

(56) References Cited

U.S. PATENT DOCUMENTS 8,650,434 B2 * 2/2014 Orsini ..................... H04L 9/085
714/6.32
8,688,660 B1 * 4/2014 Sivasubramanian ........................
G06F 12/1408
707/703

(Continued)

*Primary Examiner* — John W Hayes
*Assistant Examiner* — Edgar R. Martinez-Hernandez
(74) *Attorney, Agent, or Firm* — Smith Tempel Blaha LLC; Gregory Scott Smith

(57) ABSTRACT

Systems and methods for enabling reliable transactions of data communications are provided. A processing device according to one embodiment includes a management interface and a security module. The management interface is configured to initialize a transaction having a plurality of transaction elements. The transaction is a unit of work including a set of one or more logically related data elements or functions for accomplishing a single task. The management interface is further configured to determine at least one expected value for at least one transaction element and to compare at least one actual value with the at least one expected value to obtain a comparison element. The security module is configured to execute security processes based on the comparison element.

23 Claims, 12 Drawing Sheets

Related U.S. Application Data

(60) Provisional application No. 61/836,155, filed on Jun. 18, 2013.

(51) Int. Cl.

| | | |
|---|---|---|
| *G06F 9/455* | (2018.01) | |
| *G06F 9/46* | (2006.01) | |
| *G06F 9/50* | (2006.01) | |
| *G06F 21/62* | (2013.01) | |
| *H04L 9/40* | (2022.01) | |
| *H04L 67/10* | (2022.01) | |

(52) U.S. Cl.
CPC .............. *G06F 21/62* (2013.01); *H04L 63/08* (2013.01); *G06F 9/45558* (2013.01); *G06F 2009/4557* (2013.01); *G06F 2009/45595* (2013.01); *G06F 9/5072* (2013.01); *G06F 9/5077* (2013.01); *H04L 67/10* (2013.01); *H04L 2463/102* (2013.01)

(56) References Cited

U.S. PATENT DOCUMENTS

| | | | | |
|---|---|---|---|---|
| 9,442,954 | B2* | 9/2016 | Guha | H04L 67/10 |
| 9,699,148 | B2* | 7/2017 | Barsness | H04L 41/5025 |
| 9,948,626 | B2* | 4/2018 | Zou | H04L 63/205 |
| 11,227,265 | B2* | 1/2022 | Bruckner | H04L 41/0246 |
| 11,487,347 | B1* | 11/2022 | Brown | G06F 3/01 |
| 2003/0200172 | A1* | 10/2003 | Randle | G06Q 20/10 |
| | | | | 705/39 |
| 2005/0002399 | A1* | 1/2005 | Peterson | H04L 45/00 |
| | | | | 370/392 |
| 2005/0265315 | A1* | 12/2005 | Edgar | H04L 67/10 |
| | | | | 370/352 |
| 2007/0078988 | A1* | 4/2007 | Miloushev | G06F 9/485 |
| | | | | 709/227 |
| 2009/0132804 | A1* | 5/2009 | Paul | G06F 9/5077 |
| | | | | 713/150 |
| 2010/0037296 | A1* | 2/2010 | Silverstone | G06F 9/45558 |
| | | | | 718/1 |
| 2011/0252339 | A1* | 10/2011 | Lemonik | G06F 3/04812 |
| | | | | 715/753 |
| 2011/0307486 | A1* | 12/2011 | Breslau | G06F 21/6245 |
| | | | | 707/E17.089 |
| 2012/0057456 | A1* | 3/2012 | Bogatin | H04W 4/80 |
| | | | | 370/230.1 |
| 2012/0151089 | A1* | 6/2012 | Ponmudi | H04W 76/14 |
| | | | | 709/237 |
| 2012/0179824 | A1* | 7/2012 | Jackson | H04L 47/827 |
| | | | | 709/226 |
| 2012/0317491 | A1* | 12/2012 | Wong | H04L 41/5096 |
| | | | | 715/736 |
| 2013/0006400 | A1* | 1/2013 | Caceres | H04L 12/2803 |
| | | | | 700/90 |
| 2014/0018969 | A1* | 1/2014 | Forbes, Jr. | H02J 3/322 |
| | | | | 700/295 |
| 2014/0040343 | A1* | 2/2014 | Nickolov | H04L 69/32 |
| | | | | 709/201 |
| 2014/0115161 | A1* | 4/2014 | Agarwal | H04L 41/18 |
| | | | | 709/226 |
| 2016/0179499 | A1* | 6/2016 | Reeves | G06F 9/5027 |
| | | | | 717/172 |
| 2017/0223807 | A1* | 8/2017 | Recker | H02J 13/00006 |
| 2018/0300726 | A1* | 10/2018 | Bhagavatula | G06Q 30/06 |

* cited by examiner

| TRANSACTION ELEMENT | EXPECTED VALUE | ACTUAL VALUE |
|---|---|---|
| Source ID | 2130339d | 2130339d |
| Next Route Hop ID | 2123 | 2123 |
| Send Timestamp | 12:54:12 15JUL13 | 12:54:12 15JUL13 |
| MD5 | 2345533 | 2345533 |
| Encryption | AES128 | AES128 |
| Key 1 | Txx23oojaj | Txx23oojaj |
| Key 2 | YYY23aaaoL | YYY23aaaoL |
| TTL | 255 | 255 |
| ⋮ | ⋮ | ⋮ |

ENABLING RELIABLE COMMUNICATIONS BETWEEN COMPUTING INSTANCES

CROSS-REFERENCE TO RELATED APPLICATIONS

This application is a continuation of U.S. patent application Ser. No. 14/308,600 filed on Jun. 18, 2014, which application claims the benefit under 35 U.S.C. § 119 of U.S. Provisional Application No. 61/836,155, filed on Jun. 18, 2013, both of which are incorporated herein by reference in their entirety. The entire disclosure of each is hereby incorporated by reference in their entireties.

TECHNICAL FIELD

The present disclosure relates generally to data processing and computing, and more particularly to enabling trusted communications between instances of computing.

BACKGROUND

In the field of data communications, a "transaction" is a unit of work having any number of processing steps to be performed within any data processing/communicating system. For a transaction to complete successfully, every processing step of the transaction must be executed successfully. In other words, a transaction cannot be completed partially, but must either succeed entirely or fail entirely.

For example, an electronic banking transaction may have a number of processing steps for transferring money from one account to another. In this case, the transaction may include at least two steps, where one step would involve debiting one account and another step would involve crediting the other account. Obviously, in order for this transaction to be successful, both the debiting and crediting steps must be performed. If any type of error occurs in any part of the computing system hardware and/or software that interrupts the transaction, the transaction processing system guarantees integrity of the system by ensuring that either the transaction was fully completed (i.e., committed) or there is no trace of the transaction, such as in the case of a failed transaction.

Furthermore, as technology implementations of systems generally referred to as "cloud computing" are rapidly increasing in distribution, currents are emerging in the market complicating the adoption of and communication with these technologies. Many companies and organizations rely on cloud-based implementations to handle more and more of their data, including sensitive and confidential data. However, with the rapid deployment of such services, an organization has to follow a convoluted, time-consuming, and costly process to store, retrieve and use such data. In fact, the move to more service-based, rather than product-based, business transactions accelerates this need.

In order to protect and access data in the cloud, a traditional cycle of "encrypt-transmit-store-retrieve-decrypt-use" is utilized. When two or more organizations, or two or more departments of the same organization, engage in a data-interchange using forms of cloud computing, the cycle introduces many inefficiencies, including expensive encryption, key-management, and various repetitive actions. The complexity and wastefulness increases exponentially according to the number of computing devices, applications, and data-flow paths involved.

With service providers such as Saleforce.com, ServiceNOW, SAP, etc. offering various services and formats, the administration departments and IT departments of organizations may experience difficulties handling the new complexities. In addition to the hundreds of applications a traditional IT department must maintain, the challenge now is the efficient handling or supporting of services from various providers. Further complicating the matter, these providers follow a distinct format and use diverse approaches to cloud-based implementations, thereby complicating the data flow between providers and data customers and among providers themselves. One problem is that there is very little commonality in the flow and encryption of data and in the sets of translation and mapping services. Another concern with processing data from a cloud is that there is little assurance that data arriving from a cloud indeed arrived from a specified location. A further concern with processing data from a cloud is that there is little assurance that the data arriving from a cloud traveled along a proper, correct, or desired path.

SUMMARY

Accordingly, one aspect of the present disclosure includes a method of executing a transaction within a data processing system. The method includes a step of initializing a transaction having a plurality of transaction elements, wherein the transaction is a unit of work including one or more logically related data elements or functions for accomplishing a single task. The method also includes steps of determining at least one expected value corresponding to at least one of the transaction elements and comparing at least one actual value from the at least one transaction element with the at least one expected value to obtain a comparison element. Also, the method includes controlling a security function based on the comparison element.

Another example of the present disclosure includes a processing device comprising a management interface and a security module. The management interface is configured to initialize a transaction having a plurality of transaction elements, wherein the transaction is a unit of work including a set of one or more logically related data elements or functions for accomplishing a single task. The management interface is further configured to determine at least one expected value for at least one transaction element. Also, the management interface is configured to compare at least one actual value with the at least one expected value to obtain a comparison element. The security module is configured to execute security processes based on the comparison element.

Yet another example of the present disclosure is a method comprising the steps of processing data from a first application and storing the processed data in a process database, enabling a first process manager to utilize the processed data, translating the processed data to a second process manager, and allowing the second process manager to read and use the processed data.

Another embodiment of the present disclosure is an apparatus comprising a first application including application routines. The apparatus also comprises a first process manager configured to execute the application routines of the first application to provide processed data. A first process database of the apparatus is configured for storing the processed data. A process translator of the apparatus is configured to receive the processed data from the first process manager and translate the processed data to obtain translated data. The apparatus also includes a second process manager configured to receive and use the translated data.

Another aspect of the present disclosure is a method for managing transactions. The method comprises detecting at least a first computing instance within a first environment and a second computing instance within a second environment. The method also includes selectively choosing a data route from among a plurality of possible data routes for enabling a transaction to be executed among at least the first environment and the second environment. The transaction is a unit of work including one or more logically related data elements or functions for accomplishing a single task.

A further embodiment of the present disclosure is a system that comprises at least one data communication network for enabling communication among a plurality of processing devices or systems within a plurality of processing environments. The system also includes at least one cloud provider configured to enable a plurality of data processing devices to utilize computer applications in the cloud and store data in the cloud. Also, the system includes at least one computer processor configured to translate cloud data stored by a first data processing device in a first environment so that the cloud data is readable and usable by a second data processing device in a second environment.

Yet another embodiment of the invention is a method comprising the steps of translating cloud data in a first environment to a form such that the cloud data is readable by a target in a second environment. The method also comprises allowing the cloud data to be read and used by the target in the second environment.

BRIEF DESCRIPTION OF THE DRAWINGS

The present disclosure provides subject matter included in the claims at the end of the disclosure. Objects, features, and advantages of the present disclosure are apparent from the following detailed description taken in conjunction with the accompanying drawings. Like reference numerals are used throughout the drawings to denote like elements.

DETAILED DESCRIPTION

The present disclosure describes systems and methods for performing transactions and other types of data exchanges between computing devices within a data communication system. The present disclosure also describes systems and methods for ensuring security of the transactions between the computing devices. The security processes may be performed on the transaction level. The present disclosure also describes systems and methods for planning or mapping data routes to optimize desired transaction criteria. In addition, the present disclosure describes systems and methods for translating computing instances between computing devices that operate in disparate systems using separate protocols.

Figure 1:
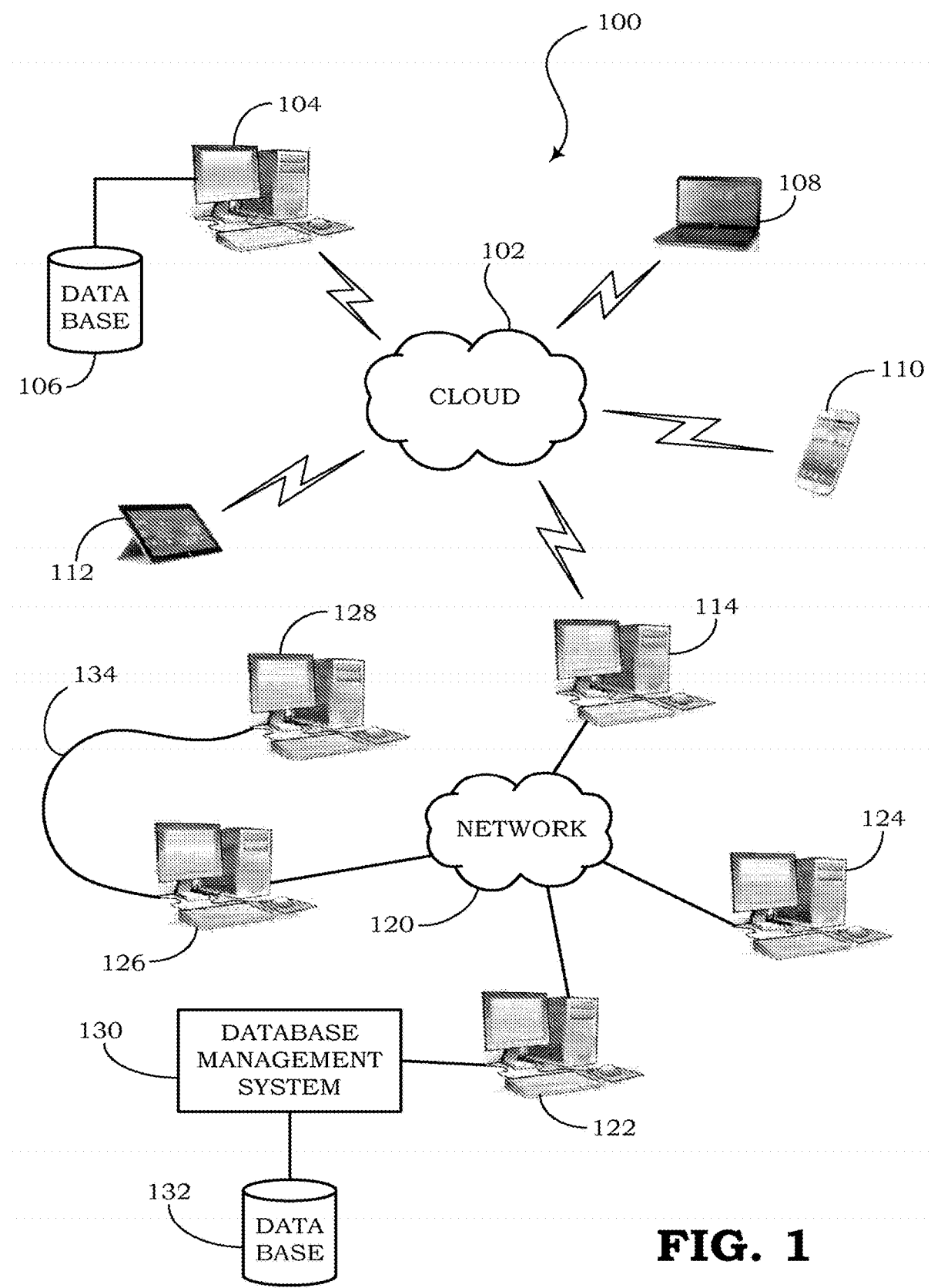
FIG. 1 is a diagram illustrating a data communication system having a number of computing devices in communication with each other, in accordance with one embodiment of the present disclosure.

FIG. 1 shows an embodiment of a data communication system 100 in which computing devices are configured to communicate with one another. The data communication system 100 may be one or more of a data processing system, a communication system, and a database management system. As illustrated, the computer system 100 comprises a cloud network 102, which may be part of the Internet or other communication network. The cloud 102 may include servers, databases, and network infrastructure for allowing cloud providers to provide cloud computing services to end users. The cloud computing services may include storing user data in databases, sharing and running computer applications, and other functions.

Although many embodiments are described with respect to computing in the cloud, it should be understood that the present disclosure is not limited to cloud computing, but may include application in any processing system or network. Particularly, the present disclosure relates to any data communication system where instances of computing are recognized.

The cloud 102 may be in wired or wireless communication with a plurality of data processing devices, which may be end user devices or other type of computing devices. The data processing devices may be servers 104 and related databases 106, laptop computers 108, mobile devices 110 (e.g., smart phones), tablet devices 112, desktop computers 114, personal computers, and other types of computing devices. In some embodiments, the data communication system 100 may include one or more secondary networks, such as network 120, which may be configured as a local area network (LAN), wide area network (WAN), or other type of network. The network 120, as shown, may be in wired or wireless communication with a plurality of computing devices, such as computers 114, 122, 124, and 126. FIG. 1 further shows the computer 122 connected to a database management system 130, which manages data in a database 132.

The data communication system 100 allows communication among the various data processing devices, computing devices, or end user devices (e.g., servers 104, laptops 108, smart phones 110, tablets 112, and computers 114, 122, 124, 126, and 128). As shown, computers 126 and 128 are able to communicate with each other via a dedicated transmission line 134. Other data processing devices may communicate among themselves via the cloud 102 and/or via network 120. The act of communicating data in order to perform certain tasks can be defined as a "transaction." A transaction is a single unit of work including one or more logically related data elements or functions for accomplishing a task.

It should be understood that communications may occur among computing devices within the same environment (such as computers 122 and 124) or within different environments (such as computer 126 and server 104). Data shared by one computing device with others may be retrieved from a database (such as databases 106 or 132), from internal memory, or other data storage media. Various modifications to the data may be necessary if the data is to be shared among computing devices within two or more different environments that are normally incompatible. For example, the laptop 108 in one environment may be able to communicate with computer 124 in a second environment with appropriate translation between different protocols on the cloud 102 and on the network 120.

Traditionally, security for executing a transaction include authorization processes in which one computer requests authentication information from another computer. Security may be established on source/destination authorization, authentication authorization, or other type of user/source/directory information. However, the present disclosure is directed to security that is performed on a transaction level. In other words, the data flow elements themselves may play a part to ensure security. As discussed herein, the data flow elements can be tied to the context of a transaction and such context can be used to monitor the data flow elements. The term "context" as used in the present disclosure refers to a state of an environment in which a transaction operates. The state of the environment may include external events, local conditions, operating conditions, and other factors of the transaction and related transactions. The context may also include an indication of whether transaction processing was a success or failure.

The processing devices of each computing device in the data communication system 100 may be configured with a management interface. The management interface, according to the present disclosure, is thereby configured to analyze the data flow elements and determine whether the data is secure. The management interface may be configured as an in-band manager operating in the same band or channel as the flow of transactions or, in other embodiments, configured as an out-of-band manager so as to exchange transaction control information in a separate band from the transaction itself.

Figures 2, 3:
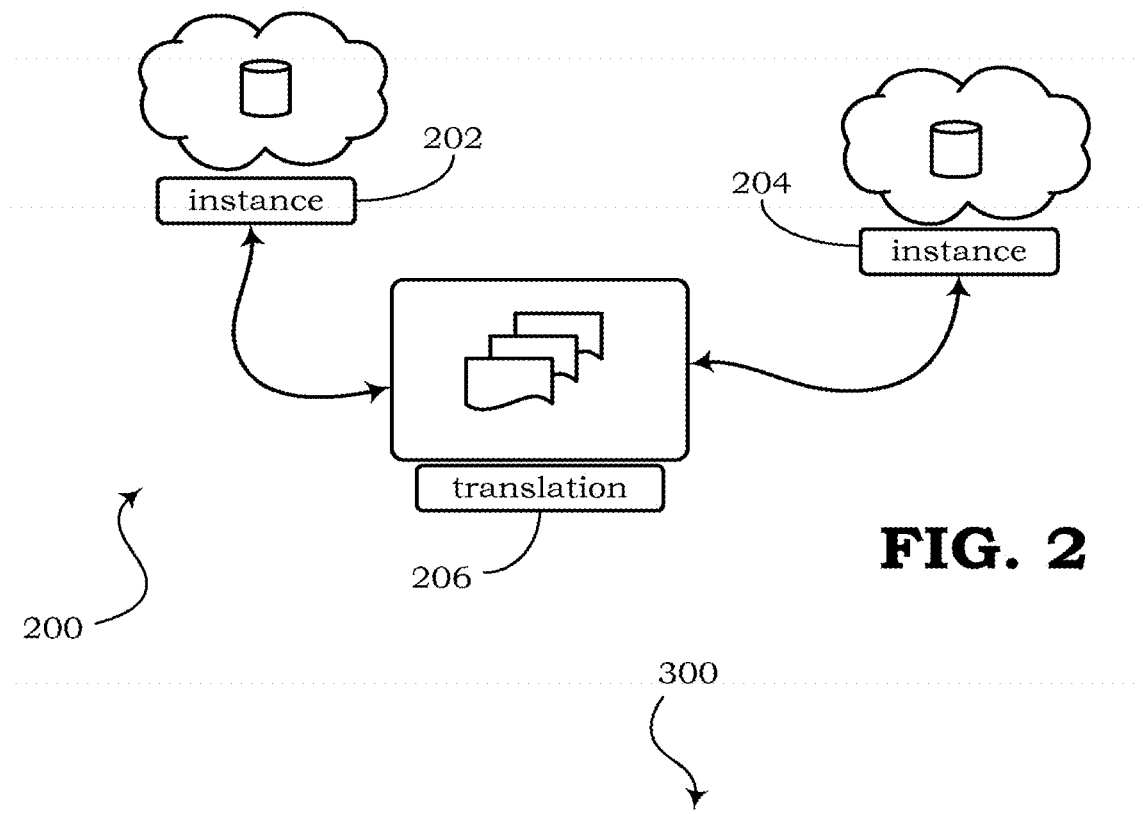
FIG. 2 is a diagram illustrating an example of a translation between two computing instances in accordance with one embodiment of the present disclosure.
FIG. 3 is an exemplary table showing a number of transaction elements in accordance with one embodiment of the present disclosure.

FIG. 2 shows an exemplary implementation of a translation between two computing instances. It should be understood that a transaction may be executed among multiple computing instances. Three or more computing instances may be translated in a similar manner as described in this example regarding two computing instances. A first computing instance 202 may be associated with a first computing device and a second computing instance 204 may be associated with a second computing device. If the first and second computing devices are configured to operate within different environments such that the communication protocol in one environment is different from the communication protocol in the other, then a translation process 206 is performed to allow the first computing instance 202 to be read and used by the second computing device performing the second computing instance 204. Also, the translation process 206 can be performed to allow the second computing instance 204 to be read and used by the first computing instance 202.

FIG. 3 shows a table 300 including a number of transaction elements according to one embodiment. As illustrated in the exemplary figure, the transaction elements may include Source ID, Next Route Hop ID, Send Timestamp, MD5, Encryption, Key 1, Key 2, and TTL. Other transaction elements may include such parameters such as Transaction ID, Source ID, Destination ID, Expiration, Return Receipt, AS Affinity, Cache Permit, Privacy Flag 1, Replication, Replication System ID, Human Language, ITSM 1, Flat, QOS, Mask 1, Log, Log PCI, among hundreds of other transaction elements that may be possible. The table 300 also shows expected values and actual values. The expected values may be determined, for example, based on the context of the transaction.

Figure 4:
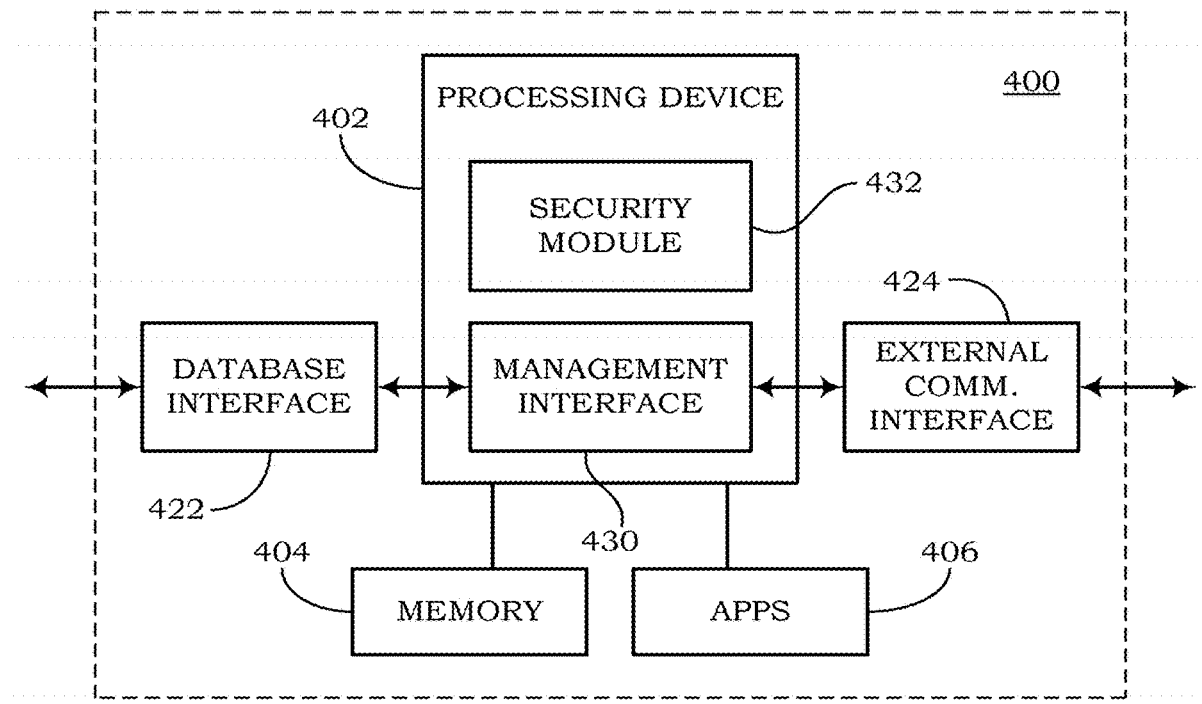
FIG. 4 is a block diagram illustrating a computing device in accordance with one embodiment of the present disclosure.

A transaction, process, method, etc. being executed within each specific computing device may be configured to perform security processes based on a comparison between the expected values and actual values of the transaction elements. As shown in the table 300, the actual values match up with the corresponding expected values. In this case, the transaction is considered secure, and the transaction is allowed to continue. If, however, the actual values do not match the expected values, a security breach has thereby been detected. The location of the security breach may be from one of the two computing instances 202 and 204 themselves to or anywhere in between, FIG. 4 shows one embodiment of a computing device 400. The computing device 400 may be any type of computer, server, laptop computer, tablet computer, smart phone, etc., such as the computing devices shown in FIG. 1. In this embodiment, the computing device 400 includes a processing, device 402, memory 404, and applications 406. According to some implementations, the applications 406 may be configured in hardware, software, and/or firmware. If configured in software, the applications 406 may be stored in the memory 404. In some embodiments, the computing device 400 may include a database interface 422, which may be optional in other embodiments. The database interface 422 may be configured to communicate with a database or database management system. The computing device 400 also includes an external communication interface 424 for enabling communication with other computing devices, such as through the cloud 102, network 120, or other communication networks.

According to the embodiment shown in FIG. 4, the processing device 402 includes a management interface 430 and a security module 432. The management interface 430 and/or security module 432 may be configured in hardware and contained within the processing device 402 (as shown) or may be configured is software and stored in the memory 404.

The management interface 430 is configured to communicate with the database interface 422 and external communication interface 424. As such, the management interface 430 may be considered to be an access port for any type of data exchange involving the computing device 400, either data transmitted outside the computing device 400 or data received into the computing device 400. To monitor transactions that involve the computing device 400, the management interface 430 may be configured to detect actual values for one or more transaction elements and compare the values with expected values, such as by using a technique including the table 300 described with respect to FIG. 3. The comparison results may be communicated from the management interface 430 to the security module 432. In some embodiments, the security module 432 is only informed when the comparison shows a discrepancy, which is indicative of a security breach. In response to receiving the comparison results or indication of the security breach, the security module 432 is configured to discontinue the transaction and/or take other security measures. The procedures for ensuring security by the management interface 430 and security module 432 may be used in place of or in addition to other existing security/validity/authentication software.

Figure 5:
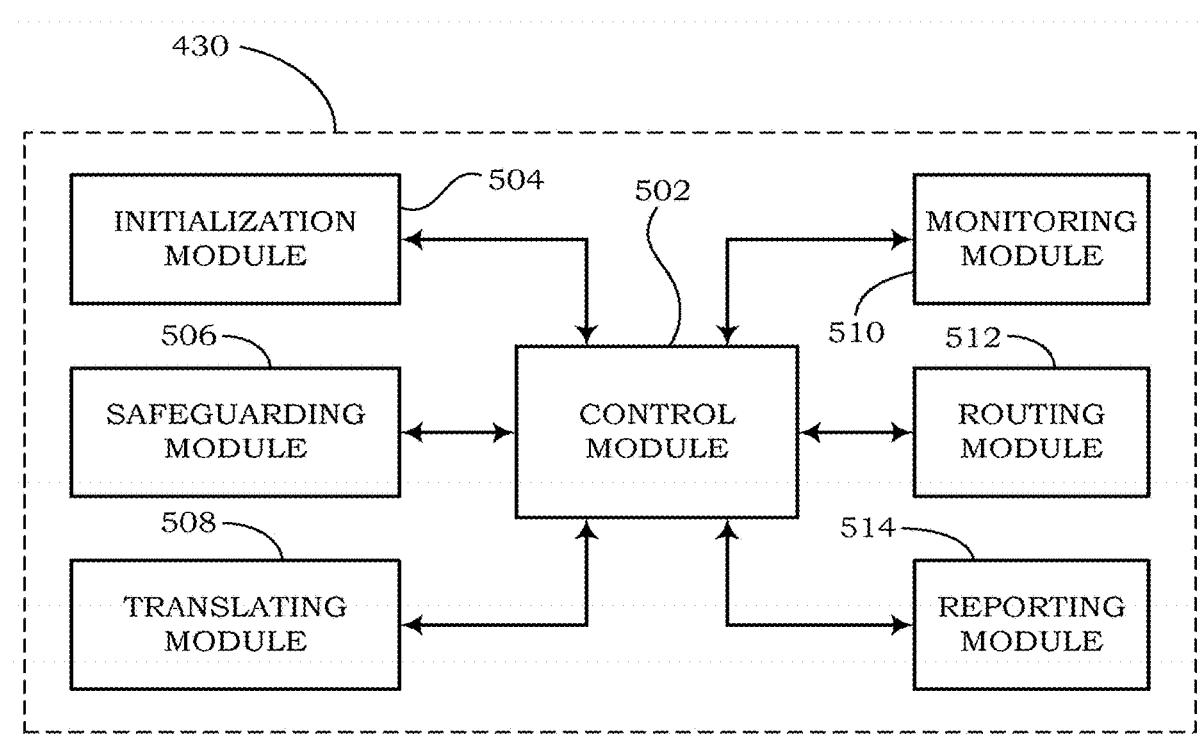
FIG. 5 is a block diagram illustrating a management interface in accordance with one embodiment of the present disclosure.

FIG. 5 shows an embodiment of the management interface 430 shown in FIG. 4. In this embodiment, the management interface 430 comprises a control module 502, an initialization module 504, a safeguarding module 506, a translating module 508, a monitoring module 510, a routing module 512, and a reporting module 514. The control module 502 is configured to control the sequence of operation of the other modules and relay signals between the modules as needed.

The initialization module 504 may be configured to identify a transaction ready to begin execution or already being executed within the processing device (e.g., processing device 402). Identifying the transaction may involve determining the content contained in the transaction. The content includes various types of data flow elements that can be used to determine the context within which the transaction is operating. For example, determining the content and context allows the transaction processing system to determine whether to encrypt, how to encrypt, what networks to transmit on, what services to use, what priority to assign, etc.

In addition to identification, the initialization module 504 is configured to prioritize transactions if two or more transactions are being executed simultaneously. Multiple transactions may operate concurrently, but a specific order is given to prioritize one before another. In this way, the transactions will complete at different times in a particular order as needed. The initialization module 504 may also be configured to mark or tag the transactions. Further details of the initialization module 504 are described below with respect to FIG. 7.

The safeguarding module 506 may include any number of security functions to protect the transmission of data. For example, the safeguarding module 506 may include encryption and obfuscation to minimize unauthorized decryption. The safeguarding module 506 may also include authentication, authorization, and digital certificate procedures. Also, physical protection, logical protection, identification, redundancy, backup capabilities, tokenization, and other procedures may also be performed in the safeguarding module 506. Further details of the safeguarding module 506 are described below with respect to FIG. 8.

The translating module 508 allows communication of a computing instance from one protocol to another. For example, the translating module 508 may translate or convert data between different database systems, between different encryption systems, between different processing systems, between different storage systems, etc. In order to enable translation, the translating module 508 may include a method of sharing encryption key information among the involved parties. In some embodiments, the key sharing may also include tokenization processes. The actions of sharing may include sharing of virtual maps and may also include the ability for the translation module 508 to translate on the fly. Using the acknowledgement of key sharing, either using stored keys or on-the-fly sharing, enhances the ability of the translating module 508 to seamlessly translate the data. Further details of the translating module 508 are described below with respect to FIG. 14.

The monitoring module 510 may be configured to perform various monitoring procedures, such as identification, detection, reviewing, validation, integration, alteration detection, and risk identification. The monitoring elements may be used to supplement the safeguarding module 506 and/or may perform other types of detection for the purposes of routing data. Further details of the monitoring module 510 are described below with respect to FIG. 16.

In some embodiments, the monitoring module 510 may be omitted or bypassed such that the management interface 430 manages the flow of transactions without the monitoring module 510. In this respect, the management interface 430 may be configured to manage flow based on the context of the transaction, which, according to some implementations, may also be based on compliance needs, such as data privacy, PCI, NIST, or financial agency compliance guidelines. The management interface 430 may also be configured to manage transaction flow based on the relation of the transaction with other transactions, based on business flow validation, business process automation, incident response, disaster recovery conditions, and other factors.

The routing module 512 allows a transaction to be communicated between two computing instances along a certain pathway. The route that is chosen may be based on the content in the data message, the context in which the data is sent, a predetermined business process, a user-determined decision, or other types of conditions. Routes may be chosen based on the security characteristics (e.g., the most secure path), speed characteristics (e.g., the fastest path), complexity characteristics (e.g., the most direct path), compliance characteristics (e.g., the safest path), etc.

The reporting module 514 is used to report whether or not a transaction is completed successfully. If the transaction fails, the reporting module 514 may notify the processing device to discontinue executing the processing steps of the transaction and roll back any steps of any partially completed transaction. The reporting module 514 may report to its own processor and, in some embodiments, may be configured to operate with the external communication interface 424 shown in FIG. 4 to alert another computing device of transaction failure or success.

Figure 6:
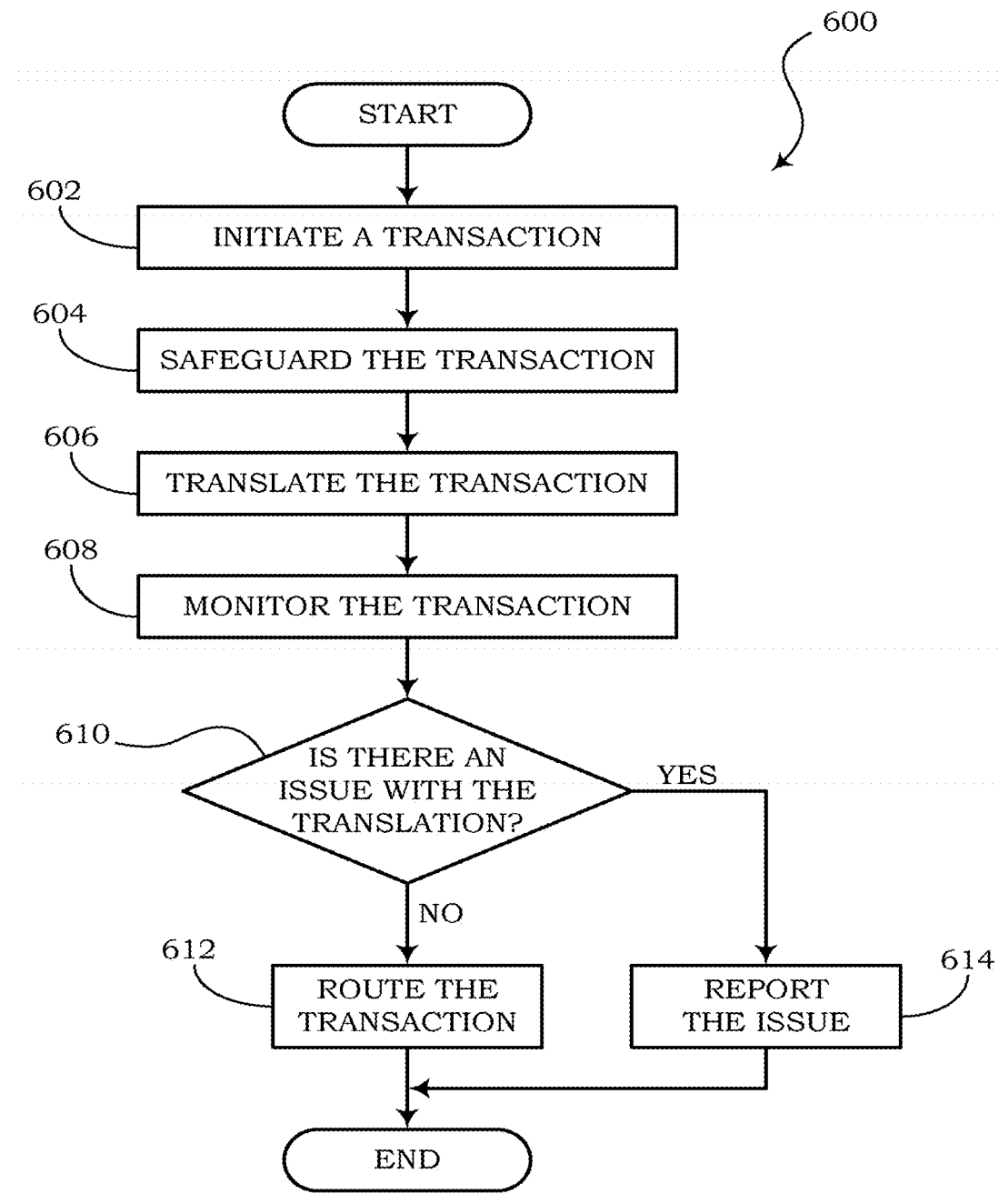
FIG. 6 is a flow diagram showing a method for ensuring reliable communication between computing instances in accordance with one embodiment of the present disclosure.
Figure 8:
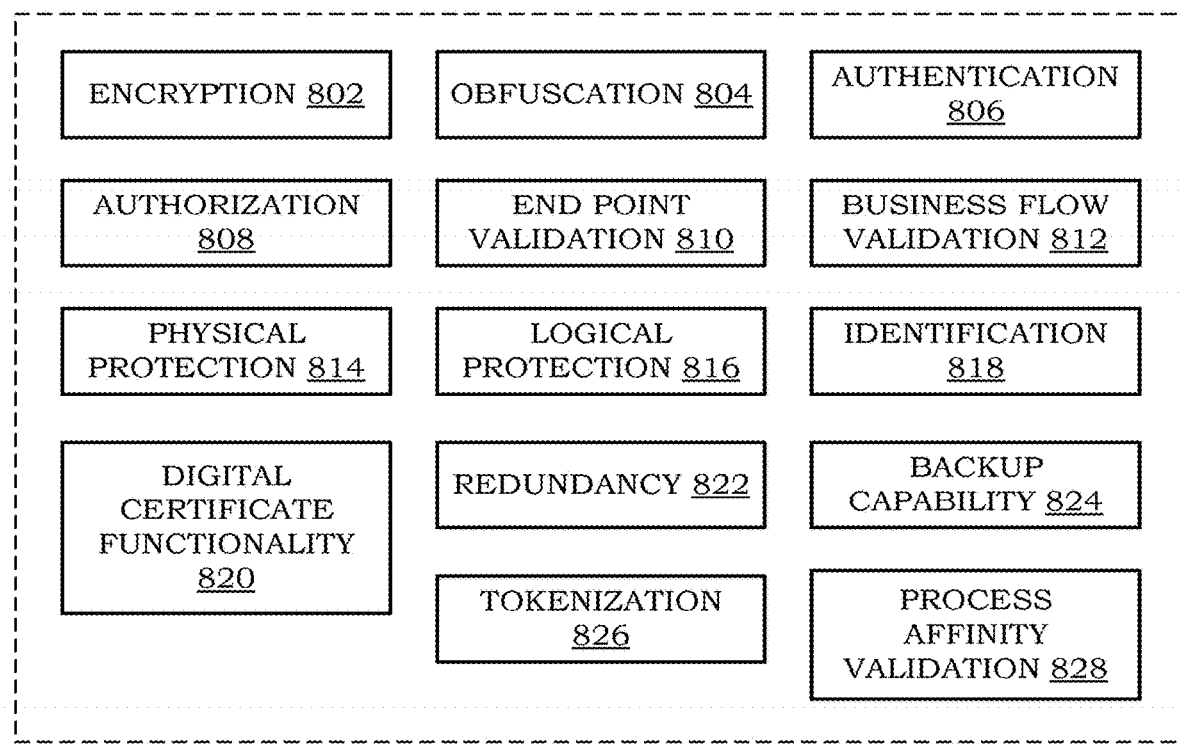
FIG. 8 is a block diagram illustrating a safeguarding module in accordance with one embodiment of the present disclosure.

FIG. 6 shows an embodiment of a method 600 for ensuring reliable communication between computing instances. According to some implementations, the method 600 may include some or all of the operations performed by the management interface 430 shown in FIG. 4 or the management interface 430 of FIG. 5. The method 600 includes the step 602 of initiating a transaction 602, which involves identifying transactions, prioritizing a plurality of transactions, and marking/tagging the transactions based on the status of the transactions. Next, the method 600 includes the step 604 of safeguarding the transaction. Safeguarding, as also shown in FIG. 8, may include encryption, obfuscation, authentication, authorization, end point validation, business flow validation, physical and logical protection, identification, digital certificate functionality, redundancy, backup capability, tokenization, process affinity validation, and other safeguarding and security processes. It should be noted, however, that the safeguarding processes in the present disclosure are performed on the transaction level itself for ensuring reliable communication without the need for authenticated communications between a source and destination as is typical in data communication systems.

FIG. 6 further includes the step 606 of translating the transaction, if necessary. For instance, if the two computing devices executing a transaction are configured to operate using different protocols (e.g., data transmission protocols), then translation is performed. In the present disclosure, the translation is again performed on the translation level at the processing device itself to enable one processing device to read, interpret, and use the data and/or commands from the other processing device. Thus, no intermediate translation service is needed, thereby simplifying the data exchange. If translation is not needed, the translation step 606 can be skipped. The method includes another step (i.e., step 608) that involves monitoring the transaction. It should be noted that the monitoring can be performed at any time during the management process, depending on various factors, such as whether or not the respective processing device is the source or destination device, whether or not translation is needed, etc. The monitoring process may include identification of aspects of the transaction, detection, reviewing, validation, integration, alteration detection, risk identification, among other procedures.

Furthermore, the method 600 of FIG. 6 includes determining whether there is an issue or error with the translation. Safeguarding issues may be detected during step 604 and monitoring issues may be detected during step 608. If issues are detected, the flow proceeds to block 614, which is a step of reporting the issue. Reporting may include indicating the existence of the issue along with other details of the issue, such as time, date, register values during and after the issue, detection result information, etc. However, if no issue or error occurs, then the method 600 proceeds to step 612 in which the transaction is routed to the appropriate computing device(s). The routing step 612 may include initially mapping out a data route and then executing the transmission of data along that route.

Figure 7:
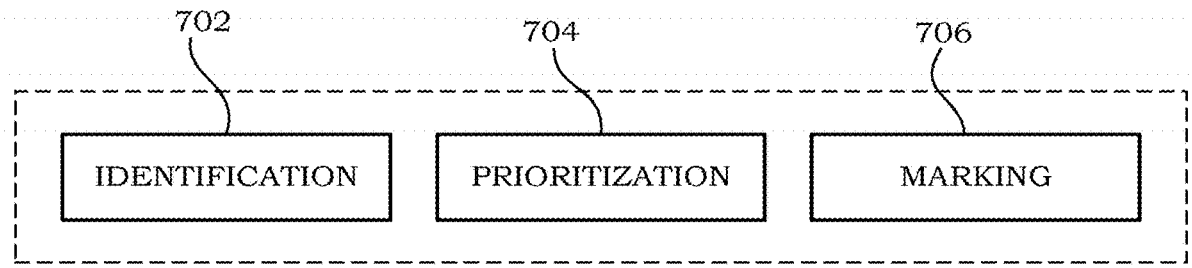
FIG. 7 is a block diagram illustrating an initialization module in accordance with one embodiment of the present disclosure.

FIG. 7 shows an embodiment of the initialization module 504 shown in FIG. 5. According to this embodiment, the initialization module 504 includes an identification unit 702, a prioritization unit 704, and a marking unit 706. The identification unit 702 is configured to identify various parameters of a transaction, such as the transaction elements discussed with respect to FIG. 3. The prioritization unit 704 determines when two or more transaction are executing at the same time and determines an order of priority. The priority may be based on whether or not one transaction relies on data resulting from another transaction, or may be based on other factors. The marking unit 706 marks or tags the transaction, or, in other words, add transaction elements (see FIG. 3) to the transaction defining the identification elements and prioritization elements.

FIG. 8 illustrates one embodiment of the safeguarding module 506 shown in FIG. 5. In this embodiment, the safeguarding module 506 includes an encryption unit 802, an obfuscation unit 804, an authentication unit 806, an authorization unit 808, an end point validation unit 810, a business flow validation unit 812, a physical protection unit 814, a logical protection unit 816, an identification unit 818, a digital certificate functionality unit 820, a redundancy unit 822, a backup capability unit 824, a tokenization unit 826, and a process affinity validation unit 828. The safeguarding module 506 may also include other types of security or safety units for ensuring that the transactions are communicated securely. The safeguarding operations can be performed in parallel with other processing actions by the processing device 402. For example, the management interface 430 can manage the transactions in an out-of-band manner. Therefore, the safeguarding steps can be accomplished while other processing is going on. In other embodiments, the management interface 430 may be configured to manage transactions in-band. The various units shown in FIG. 8 may have similar functionality to conventional safeguarding processes, but the units described in this embodiment may be configured to perform at the transaction level without the need for variable security software or other additional equipment.

Regarding the authorization unit 808 as an example, the act of authorizing a data interchange is not performed on a system level or a generating-user level, but instead can be assigned at the transaction level. Also, authorization can also be assigned at the business flow level, process automation level, and/or route assurance level. Authorization in the present disclosure may also be assigned as it relates to schemes of translation operations.

Figure 9:
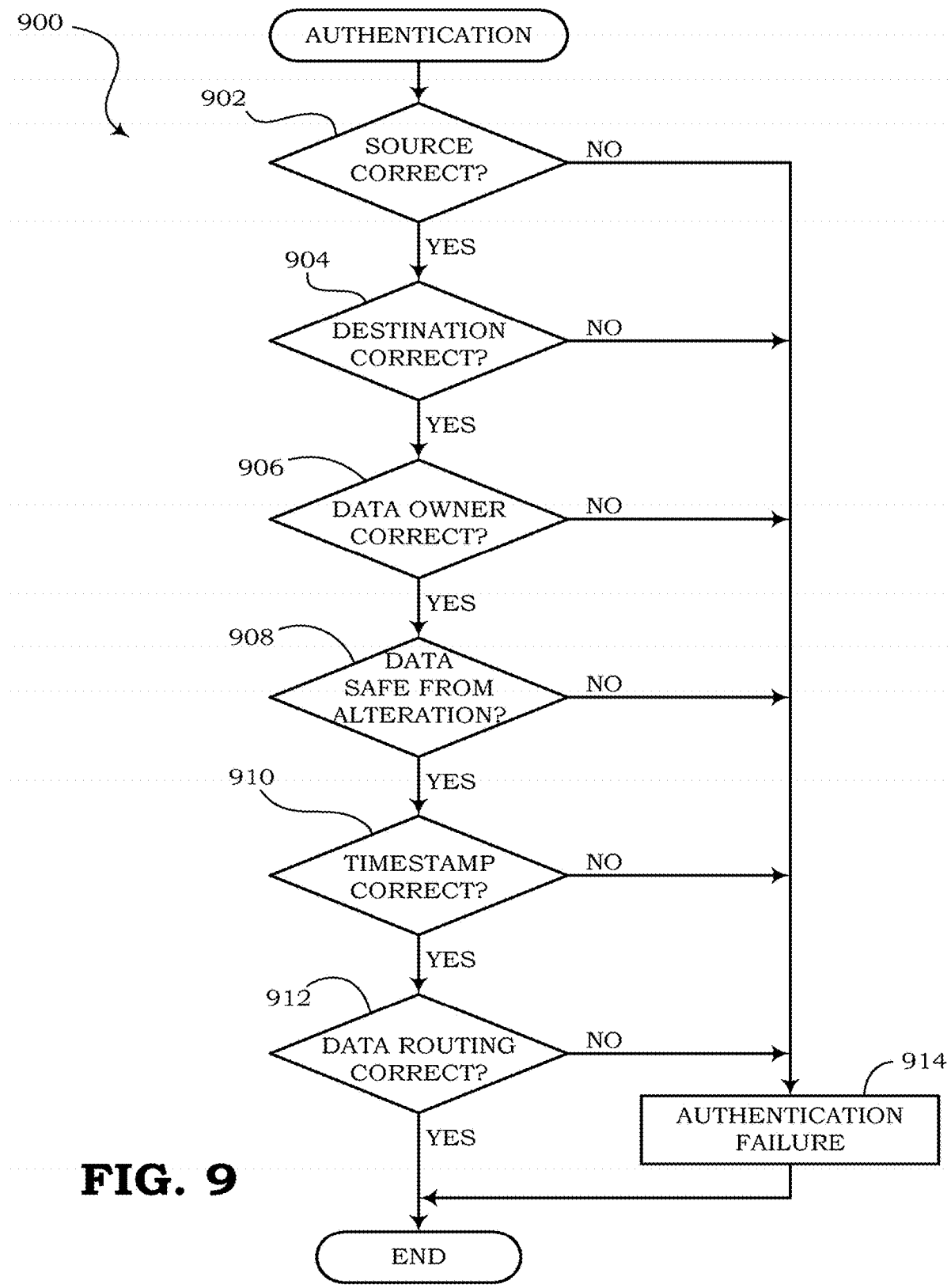
FIG. 9 is a flow diagram showing a method for authenticating a transaction in accordance with one embodiment of the present disclosure.

FIG. 9 shows a method 900 for authenticating a transaction. For example, the authentication unit 806 shown in FIG. 8 may be configured to perform the steps of method 900. As shown in FIG. 9, the method 900 includes a number of decision blocks for checking whether or not certain factors are correct. For example, block 902 checks to determine whether or not a source is correct, block 904 checks to determine whether or not a destination is correct, and block 906 checks to determine whether or not a data owner is correct. Also, block 908 checks to determine whether or not data is safe from alteration, block 910 checks to determine whether or not a timestamp is correct, and block 912 checks to determine whether or not data routing is correct. If any of the blocks determines that their respective factor is not met, then the flow of the method 900 proceeds to block 914, which indicates that the authentication has failed. Otherwise, if all checks are correct, the authentication process is successful and other safeguarding processes are performed as needed. It should be noted that the authentication method 900 may be varied on the fly based on different transaction elements that are present in the transaction. According to some embodiments, the six blocks shown in FIG. 9 may be elements that are used in all authentication methods of the present disclosure, but in other embodiments, additional or fewer of these blocks may be used, depending on the particular transaction.

Figure 10:
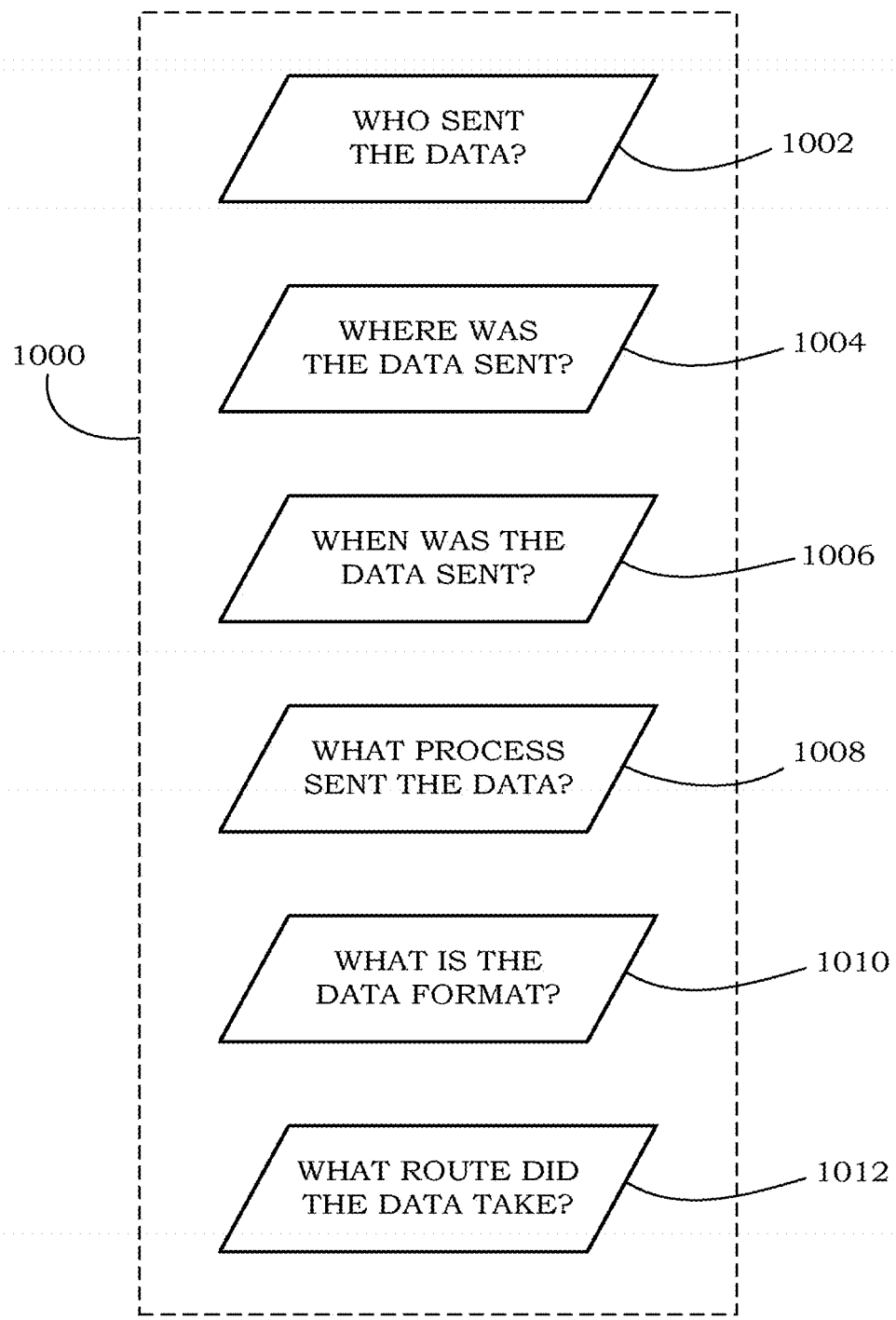
FIG. 10 is a diagram showing an implementation of an end point validation process in accordance with one embodiment of the present disclosure.

FIG. 10 is a diagram showing an implementation of an end point validation process 1000 according to one embodiment of the present disclosure. The end point validation process 1000 may be executed by the end point validation unit 810 shown in FIG. 8. According to some implementations, the end point validation process 1000 may include determining the source of the data ("who sent the data?" 1002) and the destination of the data ("where was the data sent?" 1004). In addition, the end point validation process 1000 may also include determining when the data was sent 1006, what process was used to send the data 1008, what data format was used 1010, and what route the data has taken

1012. Such processes may be used, for example, when a server needs to check the validity of an end user.

Figure 11:
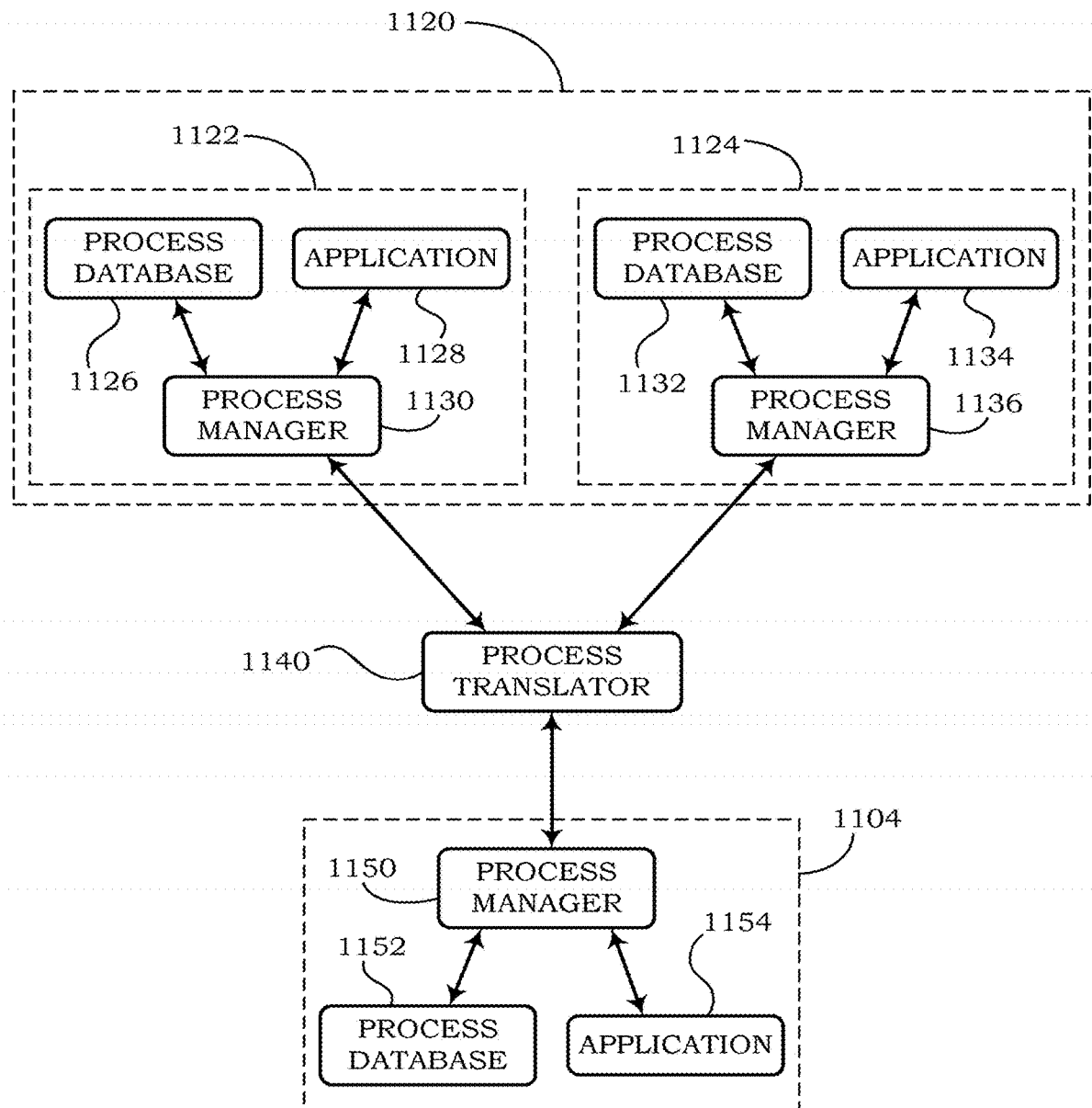
FIG. 11 is a block diagram illustrating a translation system in accordance with one embodiment of the present disclosure.

FIG. 11 shows one embodiment of a translation system 1100, which may be a part of the data communication system of FIG. 1. The translation system 1100 includes components that are managed by one or more translating modules, such as the translating module 508 shown in FIG. 5. According to the illustrated embodiment, the translation system 1100 of FIG. 11 operates between two different environments or within the same environment. For example, FIG. 11 shows a first computing device 1104 operating in a first environment. A second environment 1120 includes a second computing device 1122 and a third computing device 1124. Data may be communicated between computing devices 1122 and 1124 within the same environment (i.e., the second environment 1120). Also, data may be communicated between the computing device 1104 in the first environment and one of the computing devices 1122 and 1124 in the second environment.

As shown, the computing device 1122 includes at least a process database 1126, application 1128, and a process manager 1130. Likewise, computing device 1124 includes at least a process database 1132, application 1134, and process manager 1136; and computing device 1104 includes at least a process manager 1150, process database 1152, and application 1154. The translation module 1100 of FIG. 11 also includes a process translator 1140 for performing translation functions between the different computing devices.

According to some implementations of the translation system 1100, translating processes may be executed for providing automatic compliance with various regulatory systems. For example, some of the more recent privacy laws suggest that an escape clause, such as a penalty waiver, on a data breach be available if the accessed data is encrypted. In order to comply with the laws, the process translator 1140 may be configured ensure that certain translation processes are followed. Another example includes regulations for monetary exchanges, such as the stock market. The process translator 1140 may be configured to ensure that encryption and duplication processes comply with regulations.

The translation system 1100 may be configured in different way and may be used for translating key management data and/or tokenization data. For example, according to some embodiments, the process databases 1126, 1132, and 1152 may be configured as tokenization databases, the process managers 1130, 1136, and 1150 may be configured as tokenization managers, and the process translator 1140 may be configured as a tokenization translator. According to other embodiments, the process databases 1126, 1132, and 1152 may be configured as an encryption key database, the process managers 1130, 1136, and 1150 may be configured as encryption key managers, and the process translator 1140 may be configured as an encryption key translator.

To configure the translation system 1100 as a system for translating tokenization data, a first tokenization manager (e.g., process manager 1130) is coupled to a first tokenization database (e.g., process database 1126) and a first application (e.g., application 1128). When the first application 1128 is run by the first tokenization manager 1130, data is stored in the first tokenization database 1126. The first tokenization manager 1130 may then retrieve data from the first tokenization database 1126 and replace parts of the data that are sensitive with non-sensitive tokens to thereby tokenize the data. The tokens act as substitutes for the sensitive data so that the sensitive data cannot be obtained by an unauthorized interception of the data. The tokenization manager 1130 then communicates the tokenized data to a tokenization translator (e.g., process translator 1140), which translates the data to a format and/or protocol that can be read and used by a second tokenization manager (e.g., process manager 1136 or 1150).

To configure the translation system 1100 as a system for translating encryption key data, a first encryption key manager (e.g., process manager 1130) is coupled to a first encryption key database (e.g., process database 1126) and a first application (e.g., application 1128). When the first application 1128 is run by the first encryption key manager 1130, data is stored in the first encryption key database 1126. The first encryption key manager 1130 may then retrieve data from the first encryption key database 1126 and encrypt the data so that the data cannot be easily decrypted by an unauthorized hacker. The encryption key manager 1130 then communicates the encrypted data to an encryption key translator (e.g., process translator 1140), which translates the data to a format and/or protocol that can be read and used by a second encryption key manager (e.g., process manager 1136 or 1150).

Figure 12:
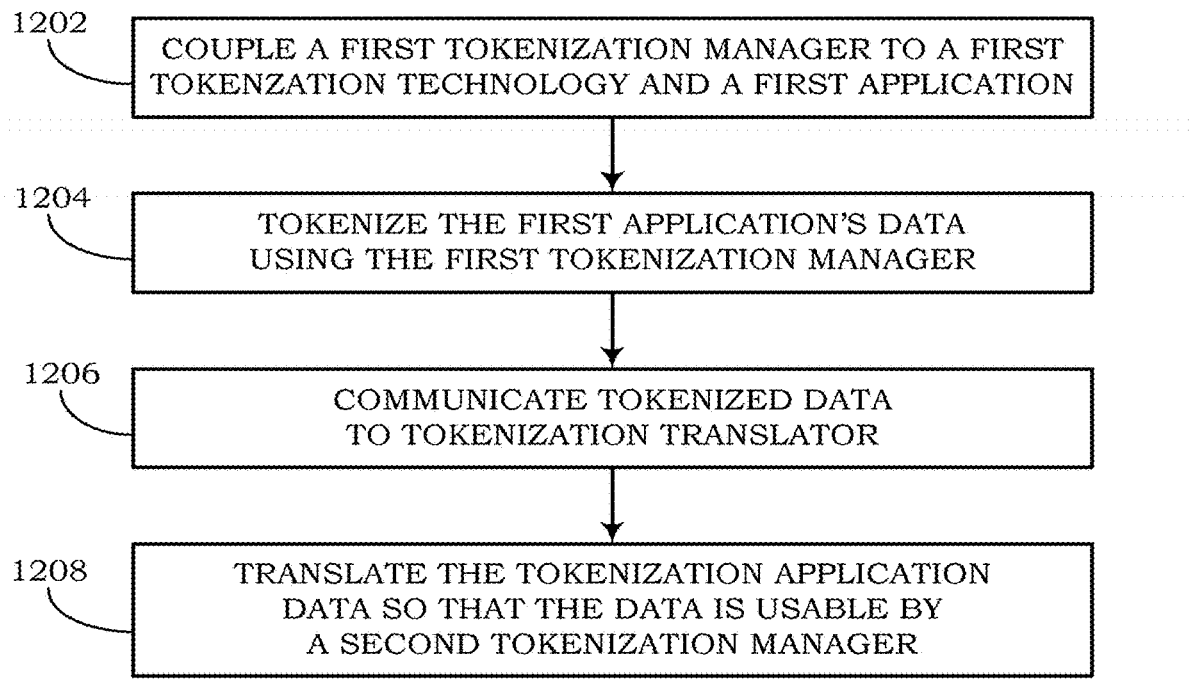
FIG. 12 is a flow diagram showing a method of translating tokenization data in accordance with one embodiment of the present disclosure.

FIG. 12 shows an embodiment of a method 1200 for managing tokenization data. The method 1200, according to some embodiments, may be executed by the tokenization unit 826 shown in FIG. 8 within the translation system 1100 of FIG. 11. As illustrated, the method 1200 includes the step 1202 of coupling a first tokenization manager to a first tokenization database and a first application. Step 1204 includes tokenizing the first application's data using the first tokenization manager. Step 1206 includes communicating the tokenized data to the tokenization translator. And step 1208 includes translating the tokenization application data so that the data is usable by a second tokenization manager.

Figure 13:
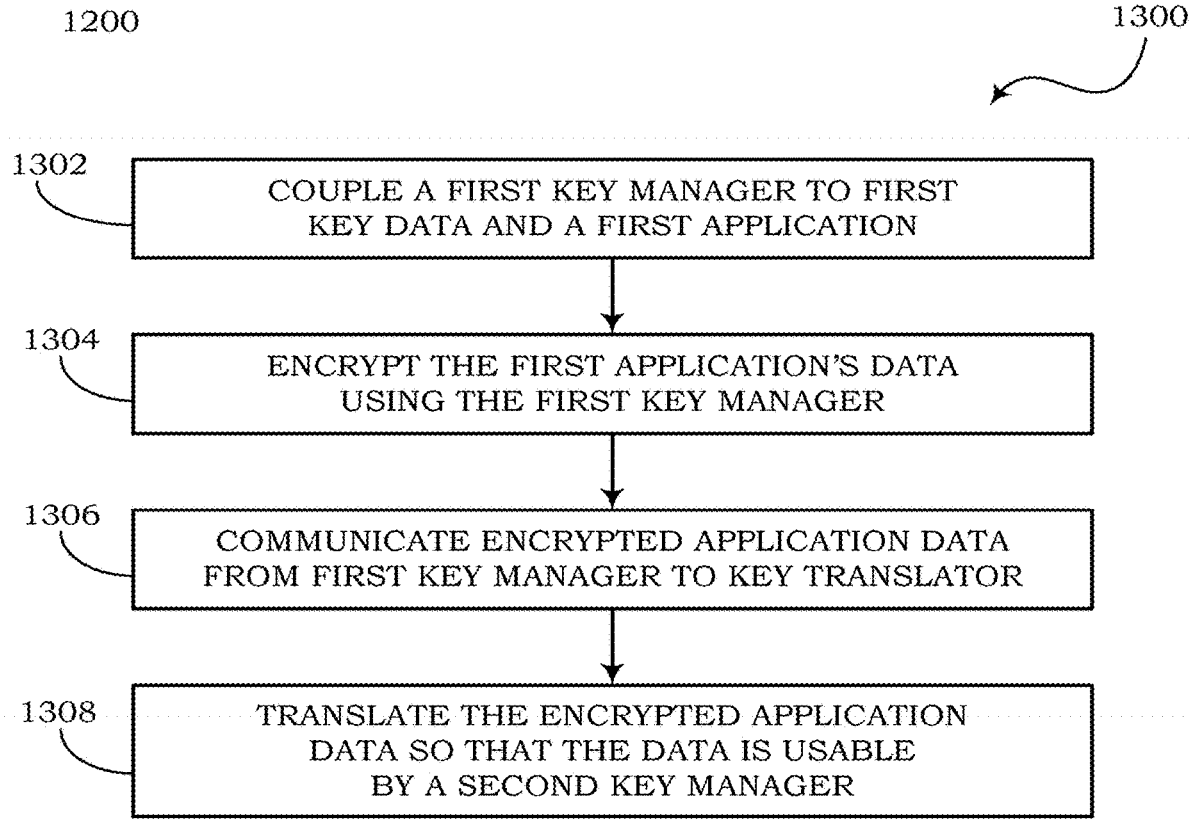
FIG. 13 is a flow diagram showing a method of translating encryption key data in accordance with one embodiment of the present disclosure.

FIG. 13 shows an embodiment of a method 1300 for managing encryption key data. The method 1300, according to some embodiments, may be executed by the encryption unit 802 shown in FIG. 8 within the translation system 1100 of FIG. 11. As illustrated, the method 1300 includes the step 1302 of coupling a first key manager to a first key database and a first application. Step 1304 includes encrypting the first application's data using the first key manager. Step 1306 includes communicating encrypted application data from the first key manager to the key translator. And step 1308 includes translating the encrypted application data so that the data is usable by a second key manager.

Figure 14:
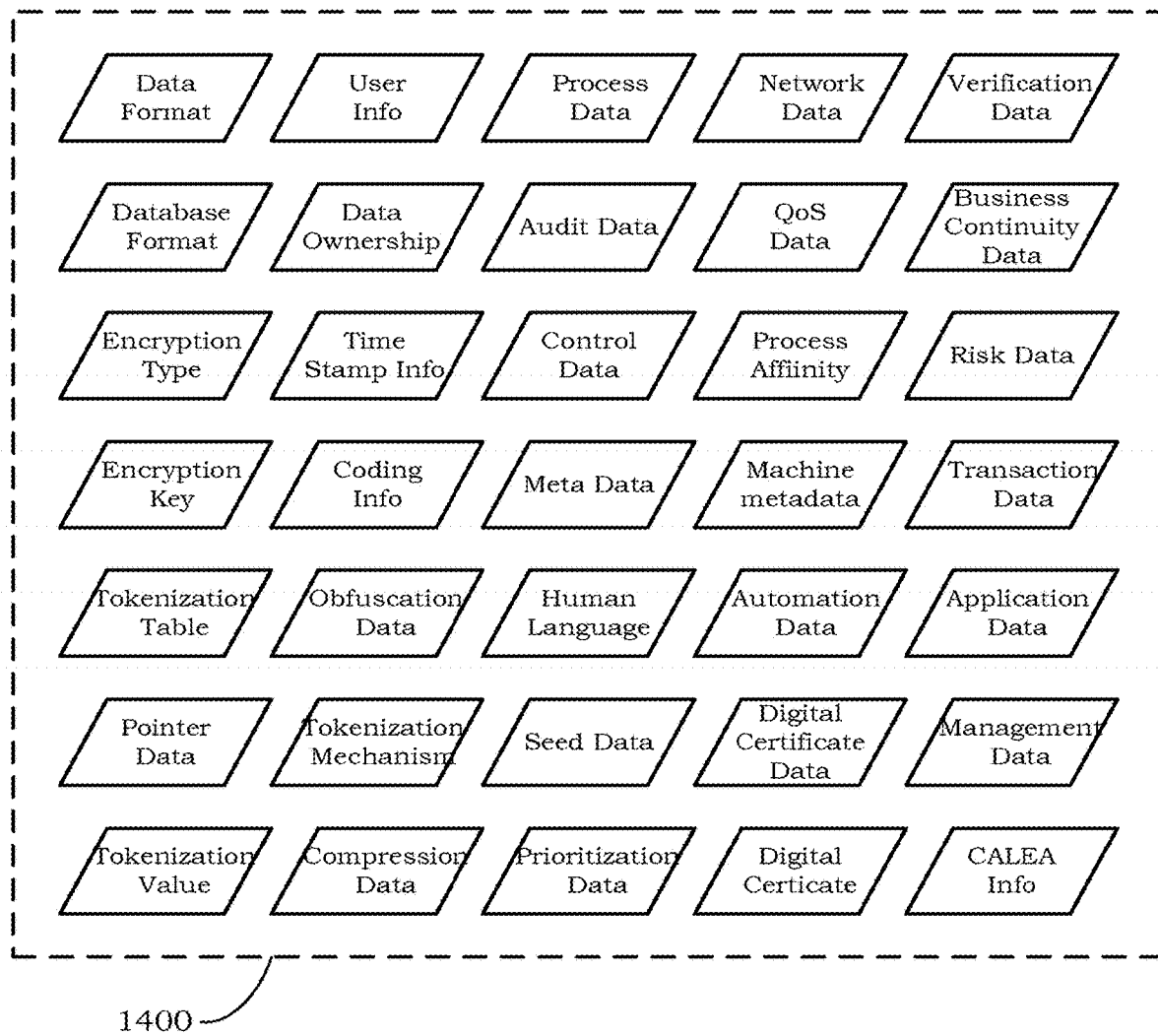
FIG. 14 is a diagram showing examples of translation information in accordance with one embodiment of the present disclosure.

FIG. 14 is a diagram showing examples of translation information, such as information used in the translation system 1100 of FIG. 11. The information used for translation purposes may include Data Format, User Information, Process Data, Network Data, Verification Data, Database Format, Data Ownership, Audit Data, QoS Data, Business Continuity Data, Encryption Type, Time Stamp Information, Control Data, Process Affinity, Risk Data, Encryption Key, Coding Information, Meta Data, Machine Metadata, Transaction Data, Tokenization Table, Obfuscation Data, Human Language, Automation Data, Application Data, Pointer Data, Tokenization Mechanism, Seed Data, Digital Certificate Data, Management Data, Tokenization Value, Compression Data, Prioritization Data, Digital Certificate, CALEA Information, etc. All or some of this information, along with additional information as needed, can be used for translating data and may be dependent on whether the translating technique utilizes tokenization and/or encryption.

Figure 15:
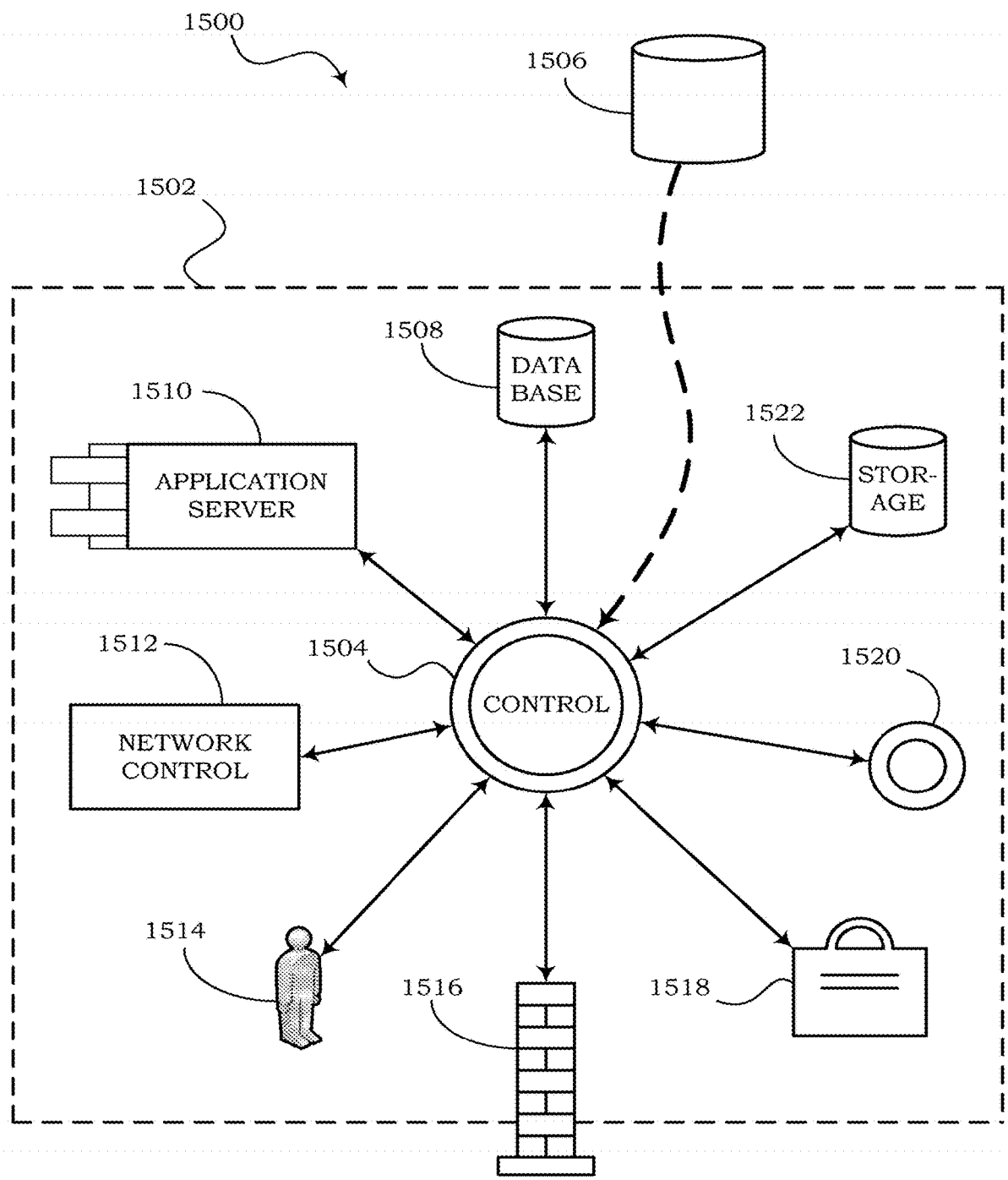
FIG. 15 is a diagram showing a business flow validation system in accordance with one embodiment of the present disclosure.

FIG. 15 is a diagram showing an embodiment of a business flow validation system 1500, which may be a part of the data communication system 100 of FIG. 1. The business flow validation system 1500 may be related to and/or managed by the business flow validation unit 812 shown in FIG. 8. In this embodiment, the business flow validation system 1500 includes a boundary 1502 that defines an environment. A control device 1504 receives a business process rule set from database 1506. The business process rule set defines one or more particular business flow processes for accomplishing various business operations. The business flow validation system 1500 also includes a database 1508, application server 1510, network control 1512, user interaction 1514, an external gateway or firewall 1516, a security subsystem 1518, a tokenization subsystem 1520, and storage 1522. The control device 1504 utilizes the various components to determine how the business operations are to be executed. This determination is controlled by the desired business flow information received from the database 1506.

Instead of following traditional rules for dictating the flow of data, the business flow validation system 1500 is capable of creating and following business rules. The business rules in this respect define data flow paths that may be optimized for a particular business strategy. For example, if sensitive data is to be transmitted, an appropriate business rule may include a stipulation that the data is transmitted with the fewest number of hops to its destination. The database 1506 contains the business process rule set that may define the data flow and/or define one or more processes or concepts to be followed that can be used to determine data flow paths. When business processes are followed, the control device 1504 automates the flow according to workflow rules and algorithms of a business process management system. Therefore, the business flow validation system 1500 is able to route transactions according to business rules, using, for example, the transaction elements as shown in FIG. 3 as meta-fields to direct the transactions according to the business rules. The creation and mapping of business flow are established at the transaction level in order to route data more efficiently.

Figure 16:
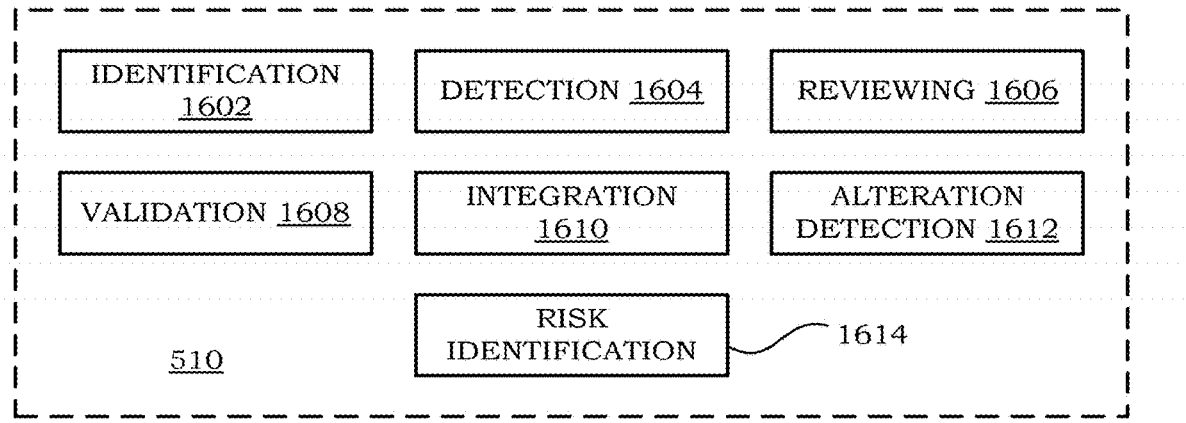
FIG. 16 is a block diagram illustrating a monitoring module in accordance with one embodiment of the present disclosure.

FIG. 16 shows an embodiment of the monitoring module 510 shown in FIG. 5. In this embodiment, the monitoring module 510 includes an identification unit 1602, a detection unit 1604, a reviewing unit 1606, a validation unit 1608, an integration unit 1610, an alteration detection unit 1612, and a risk identification unit 1614, The units shown in FIG. 16 may include conventional units for performing the respective tasks, but in this embodiment, the tasks are performed on a translation level as opposed to a higher level processing, which may involve a greater amount of resources and energy to process.

The various components of the monitoring module 510, which might normally operate on a system level, are incorporated into the data flow or transaction level. Therefore, the identification processes, detection processes, reviewing processes, validation processes, integration processes, alteration detection processes, risk identification processes, and other monitoring processes are enacted by the transaction itself. The monitoring processes can be based on the state of the transaction, the context of the transaction, and/or the relationship between the transaction and other transactions. Also, monitoring may occur based on changing business needs, business flow validation, business process automation, and/or other types of business rules. In addition, monitoring may occur based on incident response and/or disaster recovery conditions.

Figure 17:
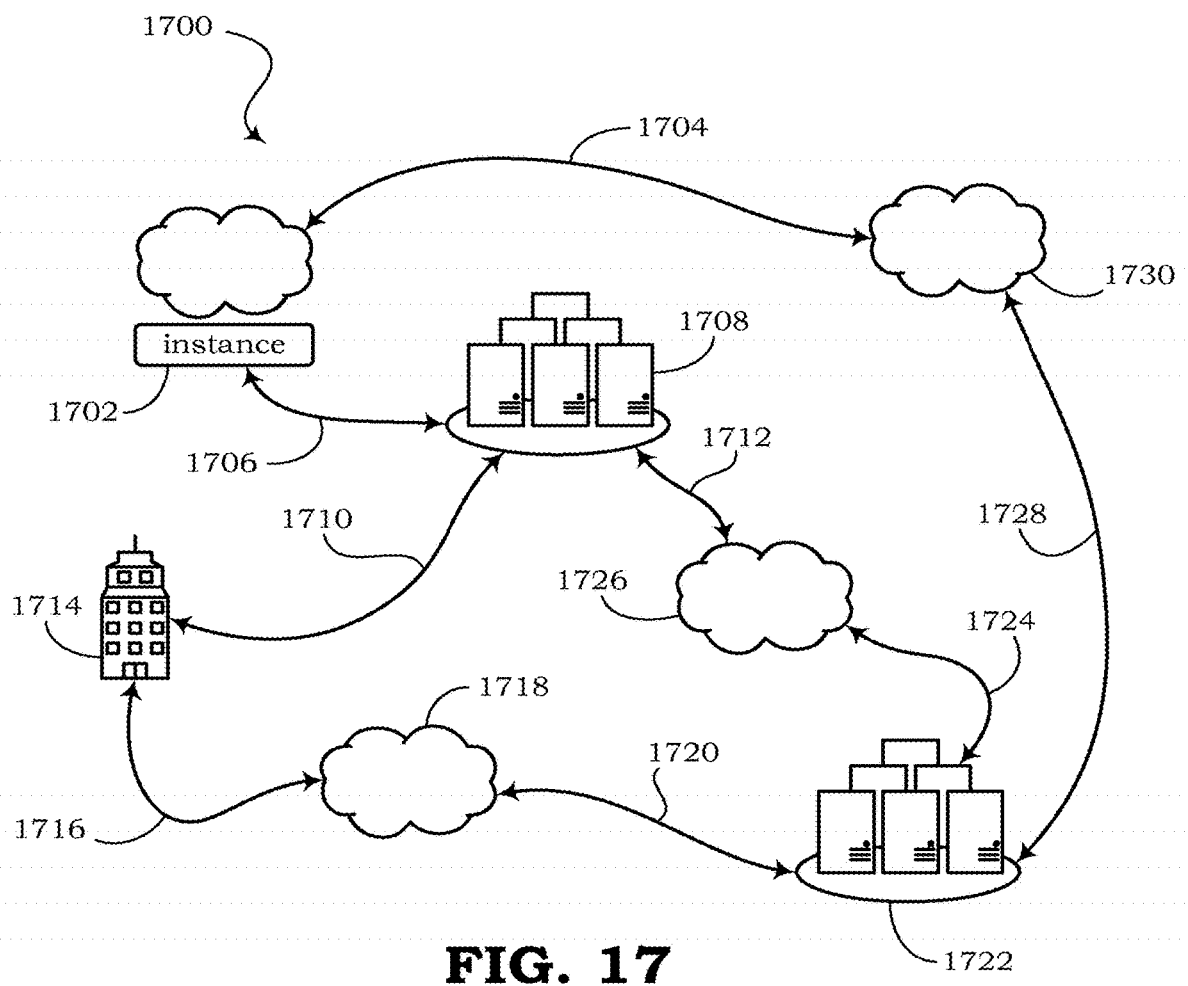
FIG. 17 is a diagram showing an example of a routing process within a data communication system in accordance with one embodiment of the present disclosure.

FIG. 17 is a diagram showing a system network 1700 for describing an embodiment of a process for routing transactions. According to the illustrated example, only a small number of components are included, but it should be understood that the system network 1700 (e.g., a cloud network or Internet) may include any number of components. The data flow begins with a computing instance 1702 being initiated. Based on various factors, such as context, content, business flow conditions, etc., a route can be mapped out to determine the path that best fits the desired factors. For example, if it is determined that the most secure path should be taken, then the transaction management system maps out such a path. As can be understood from FIG. 17, multiple paths may be taken. From the computing instance 1702, the data route may include communication paths 1704 or 1706 (or both according to some embodiments). The communication paths shown in FIG. 17 may be any combination of wired or wireless signal transmission channels.

Assuming that the data route proceeds along communication path 1706, a server 1708 receives data and may transmit the data along paths 1710 or 1712, where path 1710 may lead to a LAN 1714 of a specific organization and the path 1712 leads to cloud 1726. LAN 1714 communicates along path 1716 with cloud 1718, which communicates with another server 1722 along path 1720. Server 1722 connects with cloud 1718 via path 1720, connects with cloud 1726 via path 1724, and connects with cloud 1730 via line 1728.

In one example, suppose the data results of computing instance 1702 are to be stored or processed in cloud 1718. One data route may pass through server 1708 and LAN 1714 via paths 1706, 1710, and 1716. Another data route may pass through server 1708, cloud 1726, and server 1722 via paths 1706, 1712, 1724, and 1720. A third data route may pass through cloud 1730 and server 1722 via paths 1704, 1728, and 1720. It should be understood that with more complex systems, any number of routes may be possible. One of the routes (of the three possible routes shown in FIG. 16) is selected to best accommodate the desired routing factors. If speed is most critical, one of the shorter routes (i.e., the first or third route) may be selected. If following a predetermined business flow process, a route is selected that best fits this process. If security is most critical, a route is selected that may be considered to include the most secure path for transmission of data.

The system 1700 allows for workflow automation to determine data routes. Processors operating in any of the system components may be configured to customize various routes based on demand and/or selected routing factors. The workflow automation may be adaptable to various changes in the system 1700, such as when equipment is either added to or removed from the system 1700, during peak hours of system operation, etc. The workflow automation may include supply chain management, monitoring simplification, run book automation, support automation and easing, quality control, multiple partner process planning, etc.

Another factor regarding routing transaction in a system, such as system 1700, is that transactions can be routed in such a way that the data can be guaranteed in transit from the source to the destination. The routing module 512 shown in FIG. 5 is able to automatically select, per transaction or context, a specific route that the data is guaranteed to navigate. In some embodiments, a third party, such as a route assurance company or insurance company, may be configured to assure that the data is routed along the proper path. The third party can provide a confirmation to the originating device when the transaction is received and that the selected route was taken. The third party can also provide confirmation of completion of a transaction. With this system, the transaction can be guaranteed, within reason, to arrive at the proper destination with assurance of the route, assurance of secure encryption included for one or more elements and sub-elements of the transaction, assurance of translation as needed, time stamping, and management of systems for confirming that the transaction met the transmission guidelines.

According to additional implementations, the routing module 512 may also be configured to route transactions based on ownership parameters. For example, a route may be based on the ownership of the transaction itself or the ownership of the data contained within the transaction. It should be noted that a transaction may at times include data having multiple owners. Also, the routing module 512 may select a route based on ownership of an application, computing device, system, environment, network, context, etc., or partial ownership of these.

Furthermore, the routing module 512 may be configured to route transactions based on business processes. The term "business process management" (BPM) refers to a practice of arranging business processes with the desires of its clients. From the viewpoint of technology, BPM is an approach of continuously striving to enable an organization to improve its effectiveness and efficiency while also striving for innovation, flexibility, and integration with technology. The term "workflow" refers to a planned pattern of business activities.

The present disclosure thereby describes embodiments for providing transaction-level security and in-band or out-of-band management. Also, the embodiments cover data tokenization and encryption key translation, selective data flow routing, and data translation.

For example, the present disclosure describes a method of executing a transaction within a data processing system, communication system, or database management system. The method may include initializing a transaction having a plurality of transaction elements. The transaction, for example, is a unit of work including a set of one or more logically related data elements or functions for accomplishing a single task. The method also includes determining at least one expected value corresponding to at least one of the transaction elements and comparing at least one actual value from the at least one transaction element with the at least one expected value to obtain a comparison element. Security functions are controlled based on the content or context of the transaction.

More particularly, the at least one expected value may be determined based on the content and/or context of the transaction. The step of controlling the security function may comprise an authorization process to authorize the transaction based on the comparison element. The method may further include the step of determining an expected value for a sender, a source, a destination, and data format transaction elements, wherein the step of controlling, the security function comprises the step of executing an end point validation process to validate the transaction based on the comparison element.

In some embodiments, the step of determining the at least one expected value may comprise the step of determining expected values for a transaction-defining transaction element, a transaction-indicating transaction element, and a transaction-marking transaction element. Also, the step of controlling the security function may comprise the step of executing an end point validation process to validate the transaction for the transaction-defining, transaction-indicating, and transaction-marking transaction elements.

The present disclosure also described data tokenization and encryption key translation. In one embodiment, a method may include the steps of processing data from a first application and storing the processed data in a process database, enabling a first process manager to utilize the processed data, translating the processed data to a second process manager, and allowing the second process manager to read and use the processed data. The step of translating the processed data may include the step of translating the processed data between different methodologies, technologies, or environments. Translating may be based on content and/or context. The first and second process managers may be located in the same or different environments.

For example, the first process manager may be a tokenization manager, the process database may be a tokenization database, the processed data may be tokenization data, and the second process manager may be a tokenization device configured to read and use the tokenization data. In another embodiment, the first process manager may be an encryption key manager, the process database may be an encryption key database, the processed data may be encryption data, and the second process manager may be an encryption key device configured to read and use the encryption data.

The present disclosure also provides selective routing embodiments. For example, one system configured to manage transactions may include a first computing instance, a second computing instance, and at least one computer processor configured to selectively choose a data route from among a plurality of possible data routes for enabling a transaction to be executed between the first computing instance and the second computing instance. The transaction is a unit of work including a set of one or more logically related data elements or functions for accomplishing a single task. For example, the system in this case may be at least one of a data processing system, a communication system, and a database management system.

The at least one computer processor may be configured to selectively choose the data route based on the content or context of the transaction, choose a data route dictated by business rules, and search for a business process server and obtain the business rules from the business process server. The at least one computer processor may be further configured to choose a data route based on at least one of a selected level of security, selected workflow speed, and user specified rules and authorize the transaction based upon the chosen data route. For example, a higher level of security may include a route that involves the fewest number of hops from the source to the destination.

Regarding cloud data translation, a system according to one embodiment includes at least one data communication network for enabling communication among a plurality of processing devices. The system also includes at least one cloud provider configured to enable a plurality of data processing devices to utilize computer applications in the cloud and store data in the cloud. Furthermore, the system includes at least one computer processor configured to translate cloud data stored by a first data processing device in a first environment so that the cloud data is readable and usable by a second data processing device in a second environment. For example, the first and second environments may be naturally incompatible.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in non-transitory computer readable media having computer readable program code embodied thereon.

Any combination of computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, transmission line, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising the steps in any sequential or non-sequential order of:
   initiating, by a first data processing device in a first environment, a transaction in which cloud data is to be communicated to a second data processing devices in a second environment, wherein the first data processing device comprises a processor;
   monitoring, by the first data processing device in the first environment, two or more of the following:
   (a) a communication channel in which said cloud data is to be communicated to said second data processing device, (b) a first cloud environment,
(c) a second cloud environment,
(d) a plurality of cloud environments
(e) a second communication device; and
(f) transaction information related to the transaction;
based on the monitoring, determining, by at least one of the first data processing device or the second data processing device, whether translating the cloud data is needed to process the transaction;
translating, by at least one of the first data processing device and a second data processing device, the cloud data to a form such that the cloud data is comprehensible to the second data processing device, said form including the transaction information established within said first environment, wherein the form is comprehensible to the second data processing device after the translating, and wherein the translating is not performed by an intermediate translation device communicatively-situated between the first data processing device and the second data processing device;
selecting a route for the translated cloud data to traverse to the second data processing device;
transmitting the translated cloud data to the second data processing device over the selected route;
determining, by at least one of the first data processing device, the second data processing device, and a third processing device, whether there is an error with at least one of the translating and the delivering of the translated cloud data;
receiving, by the first data processing device, a confirmation that the translated cloud data is readable and usable, and that the translated cloud data was received over the selected route.

2. The method of claim 1, wherein the cloud data of the transaction is communicated to the second data processing device in a second environment.

3. The method of claim 1, wherein the monitoring commences before the transaction is initiated.

4. The method of claim 1, wherein the monitoring occurs at least in part during the transaction.

5. The method of claim 1, wherein the monitoring occurs at least in part after the transaction is completed.

6. The method of claim 1, wherein the determining, by the first data processing device, whether translating the cloud data is needed to process the transaction, commences before the transaction is initiated.

7. The method of claim 1, wherein the determining, by the first data processing device, whether translation of the cloud data is needed to process the transaction, occurs at least in part during the transaction.

8. The method of claim 1, wherein the determining, by the first data processing device, whether translation of the cloud data is needed to process the transaction, occurs at least in part after the transaction is completed.

9. The method of claim 1, wherein the first processing device is located on a first user's premise.

10. The method of claim 1, wherein the first processing device is located in a first cloud environment.

11. The method of claim 1, wherein the first processing device is located in a location other than a first user's premise and a first cloud environment.

12. The method of claim 1, wherein the first processing device is distributed among a first user's premise and a first cloud environment.

13. The method of claim 1, wherein the first processing device is distributed among at least two cloud environments.

14. The method of claim 1, wherein when said monitoring includes monitoring transaction information related to the transaction, the transaction information comprises:
a unit of work having a number of processing steps,
one or more logically related data elements or functions usable to accomplish a single task, and
a plurality of transaction elements comprising one or more of a transaction ID, a source ID, a destination ID, an expiration, a return receipt, a cache permit, a privacy flag, a replication system ID, an ITS, and a quality of service.

15. The method of claim 1, wherein said selecting of a route is based on one or more of a security characteristic, a speed characteristic, a complexity characteristic, and a compliance characteristic.

16. The method of claim 1, wherein said translating, by the first data processing device, the cloud data to a form such that the cloud data is comprehensible to the second data processing device, comprises translating the cloud data to a form that is readable by the second data processing device.

17. The method of claim 1, wherein the second data processing device is located on a second user's premise.

18. The method of claim 1, wherein the second processing device is located in a second cloud environment.

19. The method of claim 1, wherein the second processing device is located in a location other than a first user's premise and a first cloud environment.

20. The method of claim 1, wherein a second processing device is distributed among a second user's premise and at least one cloud environment.

21. The method of claim 1, wherein the second processing device is distributed among at least two cloud environments.

22. The method of claim 1, wherein selecting a route for the cloud data to traverse to the second data processing device occurs in response to a determination by the first data processing device that there are no errors in the translating of the cloud data.

23. The method of claim 1, wherein the first environment is incompatible with the second environment without the translating.

* * * * *